US009074626B2

(12) United States Patent
Takahashi et al.

(10) Patent No.: US 9,074,626 B2
(45) Date of Patent: Jul. 7, 2015

(54) AC GENERATOR FOR VEHICLE

(71) Applicants: Tomoki Takahashi, Tokyo (JP);
Hideyuki Hayashi, Tokyo (JP)

(72) Inventors: Tomoki Takahashi, Tokyo (JP);
Hideyuki Hayashi, Tokyo (JP)

(73) Assignee: Mitsubishi Electric Corporation,
Tokyo (JP)

( * ) Notice: Subject to any disclaimer, the term of this patent is extended or adjusted under 35 U.S.C. 154(b) by 0 days.

(21) Appl. No.: 14/525,284

(22) Filed: Oct. 28, 2014

(65) Prior Publication Data

US 2015/0043856 A1 Feb. 12, 2015

Related U.S. Application Data

(62) Division of application No. 14/131,850, filed as application No. PCT/JP2011/074055 on Oct. 19, 2011.

(51) Int. Cl.
| F16C 35/07 | (2006.01) |
| F16C 19/06 | (2006.01) |
| H02K 5/173 | (2006.01) |
| H02K 7/08 | (2006.01) |
| F16C 35/067 | (2006.01) |

(52) U.S. Cl.
CPC .............. *F16C 35/07* (2013.01); *H02K 5/1732* (2013.01); *H02K 7/08* (2013.01); *F16C 19/06* (2013.01); *F16C 35/067* (2013.01)

(58) Field of Classification Search
CPC .... H02K 7/08; H02K 5/1732; F16C 2226/60; F16C 35/077

USPC ......... 384/490, 519, 537, 540, 546, 562–563, 384/583–584, 547
See application file for complete search history.

(56) References Cited

U.S. PATENT DOCUMENTS

| 3,652,139 | A | * | 3/1972 | Memery ......................... 384/99 |
| RE30,210 | E | | 2/1980 | Buono et al. |
| 4,207,780 | A | | 6/1980 | Saxton |
| 4,214,796 | A | * | 7/1980 | Monzel et al. ................. 384/581 |
| 4,229,058 | A | * | 10/1980 | Arrowsmith et al. ........... 384/99 |
| 4,337,982 | A | * | 7/1982 | Moringiello et al. ......... 384/581 |
| 4,353,604 | A | * | 10/1982 | Dulberger et al. ............ 384/584 |
| 4,400,098 | A | * | 8/1983 | Lacey et al. ................... 384/473 |
| 6,285,100 | B1 | | 9/2001 | Pflueger et al. |
| 6,579,010 | B2 | * | 6/2003 | Trapp et al. ................... 384/537 |
| 6,617,735 | B2 | * | 9/2003 | Tan et al. ........................ 310/91 |
| 6,695,478 | B2 | * | 2/2004 | Bos et al. ........................ 384/99 |

(Continued)

FOREIGN PATENT DOCUMENTS

| DE | 3014487 A | 10/1981 |
| JP | 56-086853 U | 7/1981 |

(Continued)

*Primary Examiner* — Marcus Charles
(74) *Attorney, Agent, or Firm* — Sughrue Mion, PLLC; Richard C. Turner

(57) ABSTRACT

In An AC generator for a vehicle in which a bearing is inserted into a bearing box formed in a bracket and the bearing is fixed and retained by a retainer, the retainer has a cylindrical shape and a threaded portion is formed on the cylindrical section thereof, a threaded portion is formed on the bearing box, and the threaded portion of the retainer is directly screwed to the threaded portion of the bearing box in order to fix and retain the bearing, so that the gap between the outer circumference surface of the bearing box or the outer circumference surface of the retainer and the opposing side of a cooling fan is made uniform.

3 Claims, 4 Drawing Sheets

(56) References Cited

U.S. PATENT DOCUMENTS

| | | |
|---|---|---|
| 7,036,648 B2 | 5/2006 | Bowen |
| 7,116,020 B2 * | 10/2006 | Armiroli et al. ............ 310/68 D |
| 7,665,897 B2 * | 2/2010 | Alam et al. .................... 384/474 |
| 2008/0061641 A1 | 3/2008 | Koumura et al. |
| 2011/0248599 A1 | 10/2011 | Schurig et al. |

FOREIGN PATENT DOCUMENTS

| | | |
|---|---|---|
| JP | 63-024262 U | 2/1988 |
| JP | 63-044657 U | 3/1988 |
| JP | 63-181637 A | 7/1988 |
| JP | 63-147932 U | 9/1988 |
| JP | 02-060459 U | 5/1990 |
| JP | 04-025031 U | 2/1992 |

* cited by examiner

AC GENERATOR FOR VEHICLE

CROSS-REFERENCE TO RELATED APPLICATIONS

This application is a Divisional of U.S. application Ser. No. 14/131,850 filed Jan. 9, 2014, which is a 371 of PCT Application No. PCT/JP2011/074055 filed Oct. 19, 2011; the above-noted applications incorporated herein by reference in their entirety.

TECHNICAL FIELD

The present invention relates to an AC generator for a vehicle that is mounted in a vehicle such as an automobile, a bus, or a truck.

BACKGROUND ART

For example, as disclosed in Patent Document 1, in a conventional AC generator for a vehicle, a bearing for supporting a shaft provided in a rotor is held by a bracket in such a way that at a retainer, which is a fixing plate, a screw is inserted into a retainer thread hole through a screw through-hole provided in the outer edge of a bracket bearing box.

PRIOR ART REFERENCE

Patent Document

[Patent Document 1] Japanese Utility Model Application No. 63-23262

DISCLOSURE OF THE INVENTION

Problems to be Solved by the Invention

However, such a conventional structure has following problems.

(1) Because a cooling fan provided in a rotor supported by a bearing faces a bracket bearing box, it is required to reduce the size of the bearing in order to avoid the interference between the cooling fan and a screw through-hole seat at the outer edge of the bearing box; thus, the durability is deteriorated. In the case where the size of the bearing cannot be reduced, the area of the fan needs to be reduced; thus, the coolability is deteriorated and hence the output performance and the durability are affected.

(2) Furthermore, because the screw through-hole seat is provided at the outer edge of the bearing box, there exists a difference between the distance between the rotor cooling fan and the bearing box and the distance between the rotor cooling fan and the screw through-hole seat at the outer edge of the bearing box; thus, this difference causes the cooling fan to make a wind sound.

(3) The bracket bearing box and a retainer are fastened by a separately provided screw; however, because there exists a gap between the retainer and the bearing box end face, this structure allows inbound water or dust to intrude into the bearing box.

The present invention has been implemented in order to solve the foregoing problems of the conventional technology; the objective thereof is to provide an AC generator for a vehicle that is characterized by a raised bearing durability, a raised output performance, and low noise.

Means for Solving the Problems

In an AC generator for a vehicle in which a bearing is inserted into a bearing box formed in a bracket and the bearing is fixed and retained by a retainer, the retainer has a cylindrical shape and a threaded portion is formed on the cylindrical section thereof, a threaded portion is formed on the bearing box, and the threaded portion of the retainer is directly engaged with the threaded portion of the bearing box in order to fix and retain the bearing, so that the gap between the outer circumference surface of the bearing box or the outer circumference surface of the retainer and the opposing side of a cooling fan is made uniform.

Advantage of the Invention

An AC generator for a vehicle according to the present invention eliminates the screw that has been separately provided to date; thus, the screw through-hole seat on the outer circumference portion of the bearing box can be eliminated and hence the size of the bearing can be increased without considering the screw through-hole seat. In the case where the size of the bearing is left unchanged, the area of the fan can be increased; thus, because the coolability is raised, the output performance of the generator can be raised and the durability can be enhanced due to temperature decrease in the constituent components.

Moreover, the screw through-hole seat on the outer circumference portion of the bearing box is eliminated and the outer circumference of the retainer of the bearing box is made cylindrical, so that the gap between the cooling fan and the bearing box becomes uniform (evenly spaced); therefore, no wind sound occurs and hence the noise level is lowered. Furthermore, the engagement between the male thread on the outer circumference of the retainer and the female thread on the inner circumference of the bearing box makes it difficult for outside water or dust to intrude in the bearing box.

The foregoing and other object, features, aspects, and advantages of the present invention will become more apparent from the following detailed description of the present invention when taken in conjunction with the accompanying drawings.

BEST MODE FOR CARRYING OUT THE INVENTION

Figure 1:
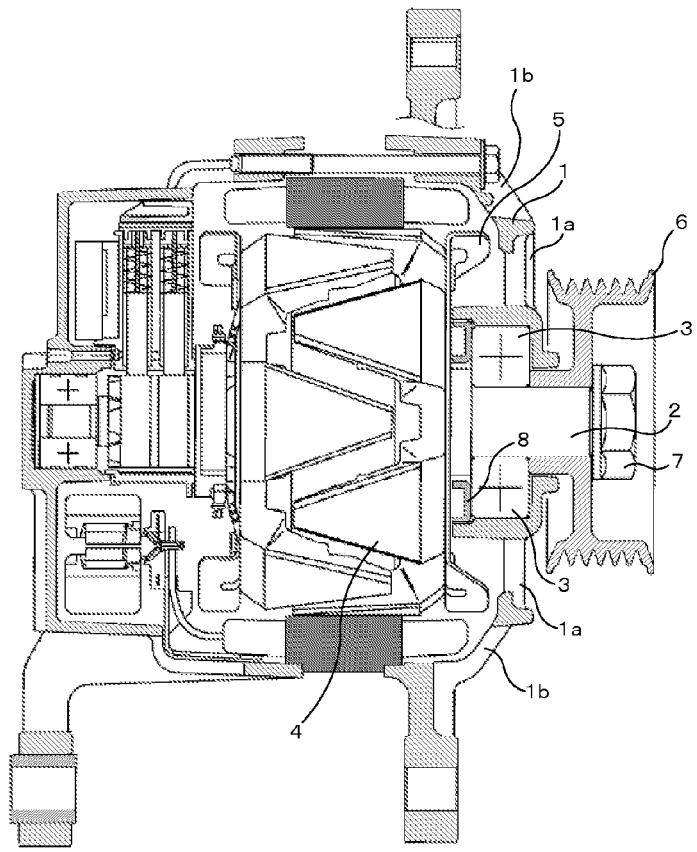
FIG. 1 is a cross-sectional view illustrating the overall configuration of an AC generator for a vehicle according to Embodiment 1 of the present invention.

Hereinafter, embodiments of the present invention will be explained with reference to the drawings. In each of the drawings, the same reference characters denote the same or equivalent constituent elements.

Embodiment 1

Figure 2:
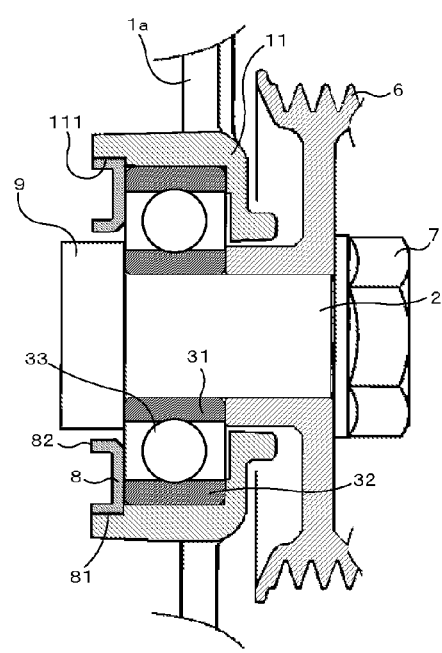
FIG. 2 is a partial cross-sectional view of the AC generator for a vehicle illustrated in FIG. 1.
Figure 3:
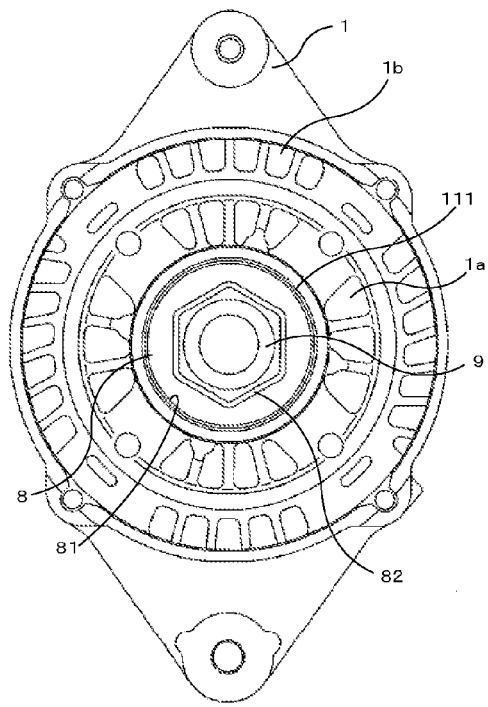
FIG. 3 is a side view of a front bracket illustrated in FIG. 1.

FIG. 1 is a cross-sectional view illustrating the overall configuration of an AC generator for a vehicle according to Embodiment 1 of the present invention; FIG. 2 is a partial cross-sectional view of the AC generator for a vehicle illustrated in FIG. 1; FIG. 3 is a side view of a front bracket illustrated in FIG. 1. In each of FIGS. 1 through 3, Reference Numeral 1 denotes a front bracket 1; at the center position thereof, a bearing box 11 is formed. Reference Numeral 2 denotes a rotation axle, and Reference Numeral 3 denotes a bearing that supports the rotation axle 2 in a rotatable manner; an inner ring 31 is fit to the rotation axle 2, and an outer ring 32 is fit to the bearing box 11. Reference Numeral 33 denotes a ball of the bearing 3; two or more balls 33 are circumferentially provided. Reference Numeral 4 denotes a magnetic-field iron core fixed to the rotation axle 2; the magnetic-field iron core 4 is configured with a pair of claw-shaped magnetic poles. Reference Numeral 5 denotes a cooling fan fixed to the side portion of the magnetic-field iron core 4; the cooling fan 5 is formed of a centrifugal fan and functions in such a way as to intake cooling air through an air inlet 1a formed in the front bracket 1 and to exhaust the cooling air through an air outlet 1b provided in the outer circumference portion of the front bracket 1. Reference Numeral 6 denotes a pulley fixed to the front end of the rotation axle 2; the crankshaft of an engine drives the pulley 6 through the intermediary of an unillustrated belt. Reference Numeral 7 denotes a nut for fixing the pulley 6 to the rotation axle 2.

Reference Numeral 8 denotes a retainer for fixing and retaining the bearing 3 in the bearing box 11; the retainer 8 is made of metal such as steel and has a cylindrical shape; a male thread 81 is formed on the outer circumference portion of the retainer 8; in the inner circumference portion thereof, there is formed a nut portion 82, which is a screwing portion for rotating a screw of the retainer 8 and protrudes in the shape of an hexagon. The male thread 81 can be screwed to a female thread 111 formed on the bearing box 11. Reference Numeral 9 denotes a spacer mounted between the inner ring 31 of the bearing 3 and the magnetic-field iron core 4.

In the AC generator for a vehicle according to Embodiment 1, configured in such a manner as described above, when the retainer 8 is mounted, at first, the bearing 3 is mounted between the rotation axle 2 and the bearing box 11. After that, the male thread 81 of the retainer 8 is screwed to the female thread 111 of the bearing box 11 in the axis direction; then, the hexagonal nut portion 82 of the retainer 8 is pivoted with a wrench or the like, so that the male thread 81 is screwed forward. Then, the retainer 8 is tightened in such a way as to press the side face of the transverse end face of the bearing 3, so that the outer ring 32 of the bearing 3 is fixed and held.

The AC generator for a vehicle, configured in such a manner as described above, according to Embodiment 1 makes it possible to eliminate the conventional screw for fixing the retainer; thus, the screw through-hole seat on the outer circumference portion of the bearing box 11 can be eliminated and hence the size of the bearing can be increased without considering the screw through-hole seat. In the case where the size of the bearing is left unchanged, the area of the fan can be increased; thus, because the coolability is raised, the output performance of the generator can be raised and the durability can be enhanced due to temperature decrease in the constituent components.

The screw through-hole seat on the outer circumference portion of the bearing box 11 is eliminated and the outer circumference of the retainer 8 of the bearing box 11 is made cylindrical, so that the gap between the cooling fan 5 and the bearing box 11 becomes uniform (evenly spaced); therefore, no wind sound occurs and hence the noise level is lowered. Furthermore, the screwing between the male thread 81 on the outer circumference portion of the retainer 8 and the female thread 111 on the inner circumference portion of the bearing box 11 makes it difficult for outside water or dust to intrude in the bearing box 11. On top of that, in the inner circumference portion of the cooling fan 5, the screwing portion of the bearing box 11 and the nut portion 82 of the retainer 8 apply a labyrinth action to an intruder through the intake inlet 1a; therefore, the effect of the intruder in the bearing 3 can be reduced and hence the reliability of the bearing 3 is raised.

Embodiment 2

Figure 4:
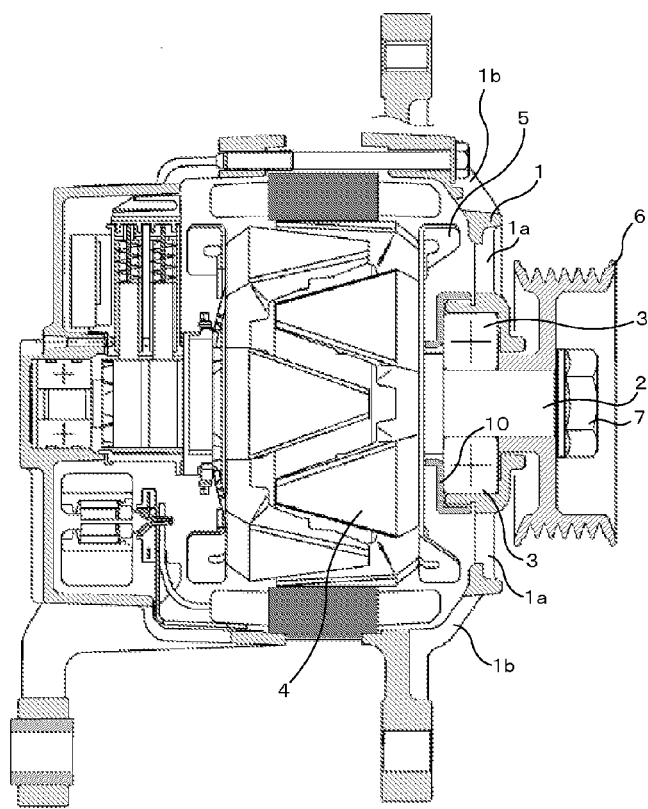
FIG. 4 is a cross-sectional view illustrating the overall configuration of an AC generator for a vehicle according to Embodiment 2 of the present invention.
Figure 5:
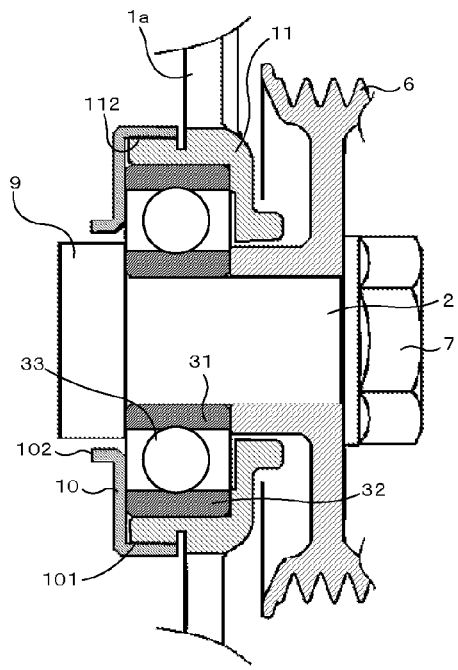
FIG. 5 is a partial cross-sectional view of the AC generator for a vehicle illustrated in FIG. 4.
Figure 6:
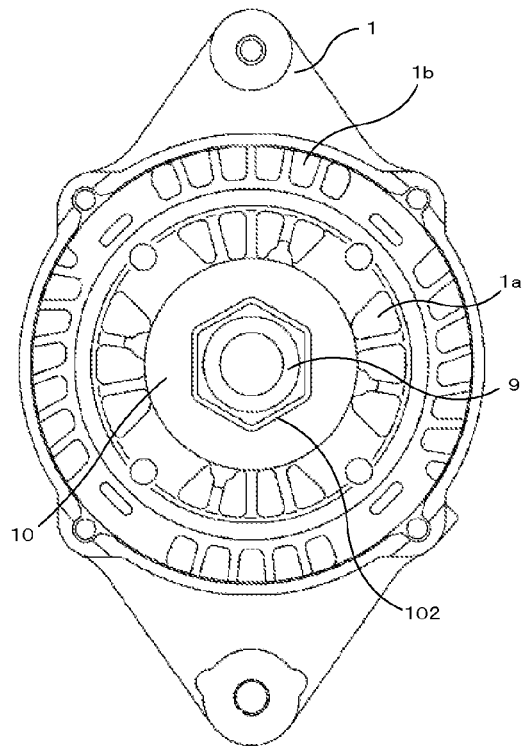
FIG. 6 is a side view of a front bracket illustrated in FIG. 4.

FIG. 4 is a cross-sectional view illustrating the overall configuration of an AC generator for a vehicle according to Embodiment 2 of the present invention; FIG. 5 is a partial cross-sectional view of the AC generator for a vehicle illustrated in FIG. 4; FIG. 6 is a side view of a front bracket illustrated in FIG. 4. In each of FIGS. 4 through 6, Reference Numeral 10 denotes a retainer for fixing and retaining the bearing 3 in the bearing box 11; the retainer 10 is made of metal such as steel and has a cylindrical shape; a female threaded portion 101 is formed at inner side of the outer circumference portion of the retainer 10; in the inner circumference portion thereof, there is formed a nut portion 102, which is a screwing portion for rotating a screw of the retainer 10 and protrudes in the shape of an hexagon. The male thread 101 of the retainer 10 can be screwed to a male thread 112 formed on the outer circumference portion of the bearing box 11.

In the AC generator for a vehicle according to Embodiment 2, configured in such a manner as described above, when the retainer 10 is mounted, at first, the bearing 3 is mounted between the rotation axle 2 and the bearing box 11. After that, the female thread 101 of the retainer 10 is screwed to the male thread 112 of the bearing box 11 in the axis direction; then, the hexagonal nut portion 102 of the retainer 10 is pivoted with a wrench or the like, so that the female thread 101 is screwed forward. Then, the retainer 10 is tightened in such a way as to press the side face of the transverse end face of the bearing 3, so that the outer ring 32 of the bearing 3 is fixed and held.

The AC generator for a vehicle, configured in such a manner as described above, according to Embodiment 2 has the same effect as Embodiment 1 described above, and the axis-direction protruding dimension of the bearing box 11 can be made shorter than that of Embodiment 1; therefore, the space in the inner circumference portion of the cooling fan 5 can efficiently be utilized, and the axis-direction dimension can be decreased.

Embodiment 3

Figure 7:
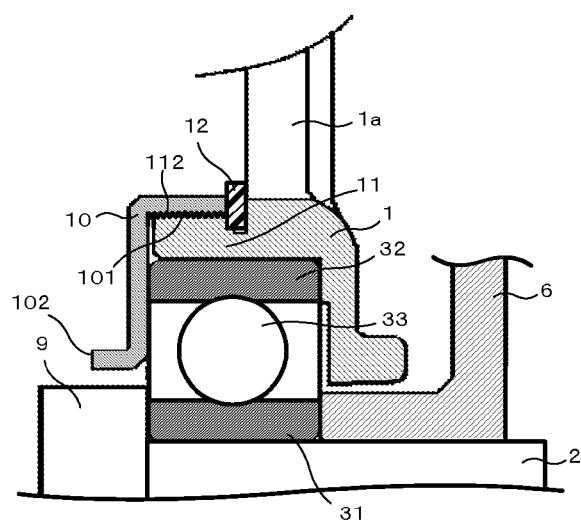
FIG. 7 is a partial cross-sectional view illustrating the principal parts of an AC generator for a vehicle according to Embodiment 3 of the present invention.

FIG. 7 is a cross-sectional view illustrating the principal parts of an AC generator for a vehicle according to Embodiment 3 of the present invention. In FIG. 7, Reference Numeral 12 denotes a ring-shaped sealing material that is formed of an elastic body such as rubber and is mounted between the right end portion of the female threaded portion 101 of the retainer 10 and the base of the male threaded portion 112 of the bearing box 11 in the front bracket 1.

In the AC generator for a vehicle according to Embodiment 3, at first the sealing material 12 is mounted on the male threaded portion 112 of the bearing box 11. After that, the female threaded portion 101 of the retainer 10 is screwed to the male threaded portion 112 of the bearing box 11 so that the sealing material 12 is compressed and fixed in such a way as to be pressed against the right end face of the thread-formed portion of the bearing box 11.

In the vehicle AC generator, configured in such a manner as described above, according to Embodiment 3, the sealing material 12 prevents water or dust from intruding in the screwing portion between the retainer 10 and the bearing box 11; therefore, as a matter of course, the durability of the screwing portion is raised and the sealing performance for the bearing 3 can be enhanced; thus, the durability of the bearing 3 is raised and hence the reliability can be enhanced. In Embodiment 3, as the sealing material 12, an elastic body such as rubber has been exemplified; however, a resin or a high-sealing-performance paint may be utilized; furthermore, grease or the like having both a sealing effect and a rust-proof effect may be utilized.

In each of Embodiments 1 through 3, as the shape of the rotating nut portion 82 or 102 of the retainer, a hexagonal shape has been exemplified; however, it goes without saying that even a tetragonal, pentagonal, or octagonal shape may be allowed.

INDUSTRIAL APPLICABILITY

The present is optimum for an AC generator for a vehicle that is mounted in a vehicle such as an automobile, a bus, or a truck.

DESCRIPTION OF REFERENCE NUMERALS

1: front bracket
11: bearing box
111: female thread
112: male thread
2: rotation axle
3: bearing
31: inner ring
32: outer ring
33: ball
4: magnetic-field iron core
5: cooling fan
6: pulley
8, 10: retainer
81: male thread
9: spacer
101: female thread
82, 102: screwing portion (nut portion) 12: sealing material

The invention claimed is:

1. An AC generator for a vehicle comprising:
   a bearing inserted into a bearing box formed in a bracket, and the bearing is fixed and retained by a retainer,
   wherein the retainer has a cylindrical section having a cylindrical shape and a threaded portion is formed on the cylindrical section thereof, a threaded portion is formed on the bearing box, and the threaded portion of the retainer is directly screwed to the threaded portion of the bearing box in order to fix and retain the bearing, so that a gap between the outer circumference surface of the bearing box or the outer circumference surface of the retainer and the opposing side of a cooling fan is made uniform;
   wherein a female thread is formed on the inner circumference of the cylindrical section of the retainer and a screwing portion configured to be pivoted to screw the female thread in a forward direction is formed on the inner circumference portion of the retainer, and a male thread is formed on the outer circumference of the bearing box.

2. The AC generator for a vehicle according to claim 1, wherein the screwing portion of the retainer has a hexagonal shape.

3. The AC generator for a vehicle according to claim 1, wherein the retainer is disposed at a portion thereof opposing to the inner circumference of the cooling fan.

* * * * *